US006493201B1

(12) United States Patent
Kulkarni et al.

(10) Patent No.: US 6,493,201 B1
(45) Date of Patent: Dec. 10, 2002

(54) SPARK GAP RETROFIT MODULE FOR SURGE ARRESTER

(75) Inventors: Anand Sharad Kulkarni, Waukesha, WI (US); Dean Marion Jones, Pewaukee, WI (US)

(73) Assignee: McGraw-Edison Company, Houston, TX (US)

( * ) Notice: Subject to any disclaimer, the term of this patent is extended or adjusted under 35 U.S.C. 154(b) by 0 days.

(21) Appl. No.: 09/488,520

(22) Filed: Jan. 21, 2000

(51) Int. Cl.[7] .................................................. H02H 9/06
(52) U.S. Cl. ....................................................... 361/119
(58) Field of Search ................................ 361/118, 119, 361/120, 124, 127

(56) References Cited

U.S. PATENT DOCUMENTS 4,319,300 A * 3/1982 Napiorkowski et al. .... 361/119
4,394,704 A * 7/1983 Jones ......................... 361/119
4,493,006 A * 1/1985 Lange et al. ................ 361/124
4,603,368 A * 7/1986 Pagliuca ..................... 361/119
4,656,555 A 4/1987 Raudabaugh
4,899,248 A 2/1990 Raudebaugh
5,043,838 A 8/1991 Sakich
5,138,517 A 8/1992 Raudabaugh
5,172,296 A * 12/1992 Kaczmarek ................. 361/119

OTHER PUBLICATIONS

Jonathan Woodworth et al.; "New Surge Arrester Technology Offers Substantial Improvement in Protection and Reliability"; Cooper Power Systems Bulletin —Feb. 1992; Ref: See, File Ref. 235.

D. Curtis Henry et al.; "Protection of Underground Circuits with Gapped MOV Technology Offers Improved Margins of Protection"; Cooper Power Systems Bulletin—Sep. 1990.

* cited by examiner

*Primary Examiner*—Adolf Deneke Berhane
(74) *Attorney, Agent, or Firm*—Fish & Richardson P.C.

(57) ABSTRACT

A surge arrester having electrical connections to a source of power and to electrical ground is retrofitted with a spark gap assembly to improve performance of the surge arrester. This is accomplished by a providing a spark gap module including at least one spark gap assembly sealed within a housing, disconnecting an electrical connection of the surge arrester, and connecting the spark gap module between the electrical connection and the surge arrester.

39 Claims, 5 Drawing Sheets

SPARK GAP RETROFIT MODULE FOR SURGE ARRESTER

TECHNICAL FIELD

The invention relates to surge arresters.

BACKGROUND

Electrical transmission and distribution equipment is subject to operating voltages within a fairly narrow range under normal conditions. However, system disturbances, such as lightning strikes, poor regulation, unbalanced loads, and switching surges, may produce momentary or extended voltage levels, especially on one or more phases of a multi-phase system, that greatly exceed the levels experienced by the equipment during normal operating conditions. These system variations often are referred to as overvoltage conditions and may lead to the damage of surge arresters installed to protect against transient overvoltages.

If not protected from transient current surges, critical and expensive equipment, such as transformers, switching devices, computer equipment, and electrical machinery, may be damaged or destroyed. Accordingly, system designers routinely use surge arresters to protect system components from dangerous overvoltage conditions.

A surge arrester is a protective device that is commonly connected in parallel with a comparatively expensive piece of electrical equipment so as to shunt or divert overvoltage-induced current surges safely around the equipment, thereby protecting the equipment and its internal circuitry from damage. The surge arrester normally operates in a high impedance mode that provides a relatively high impedance current path to ground. When exposed to a transient overvoltage condition, the surge arrester operates in a low impedance mode that provides a relatively low impedance current path to electrical ground (or earth). The impedance of the current path is substantially lower than the impedance of the equipment being protected by the surge arrester when the surge arrester is operating in the low impedance mode, and is otherwise substantially higher than the impedance of the protected equipment when in the high impedance mode.

Upon discharge of the transient overvoltage condition, the surge arrester returns to operation in the high impedance mode. This prevents normal current at the system frequency from following the surge current to ground (or earth) through the surge arrester.

Gapless surge arresters typically include an outer enclosure or housing made of an electrically insulating material, a pair of electrical terminals for connecting the arrester between a line-potential conductor and electrical ground (or earth), and an array of other electrical components that form a series electrical path between the terminals. These components typically include a series assembly of voltage-dependent, nonlinear resistive elements, referred to as varistors. A varistor is characterized by having a relatively high resistance when exposed to a normal operating voltage, and a much lower resistance when exposed to a higher voltage, such as is associated with a transient overvoltage condition. A metal-oxide varistor ("MOV") is one type of varistor. In addition to varistors, a surge arrester may include one or more spark gap assemblies housed within or outside the insulating enclosure and electrically connected in series with the varistors.

SUMMARY

In one general aspect, the invention features retrofitting a surge arrester having electrical connections to a source of power and to electrical ground with a series connected spark gap assembly to improve performance of the surge arrester. A spark gap module including at least one spark gap assembly sealed within a housing is provided. An electrical connection of the surge arrester is disconnected, and the spark gap module is connected between the electrical connection and the surge arrester.

Embodiments may include one or more of the following features. For example, the spark gap module may be connected between the surge arrester and the source of power, or between the surge arrester and electrical ground.

The surge arrester may be a gapless surge arrester. For example, the surge arrester may be a gapless distribution arrester having a 3–36 kV rating, and rated for normal duty (5 kA) or heavy duty (10 kA) operation, although not limited to these ratings.

The spark gap module may consist of one or more gap assemblies positioned between a pair of terminals, with the one or more gap assemblies and the terminals sealed within the housing. Each terminal may include a threaded bolt hole. The housing may be a porcelain or polymer housing that may or may not have defined weathersheds.

The spark gap assembly may include a resistive or capacitive graded gap structure. The gap structure may include electrodes separated by silicon carbide grading resistors, ceramic capacitors, or other impedance elements.

In another general aspect, the invention features a retrofit module for adding a spark gap assembly to a surge arrester to improve performance of the surge arrester. The module includes a housing, at least one spark gap assembly sealed within the housing, and structure for electrically connecting the spark gap assembly to a surge arrester, the structure being accessible from outside the housing.

Other features and advantages will be apparent from the following description, including the drawings and the claims.

DETAILED DESCRIPTION

Figure 1:
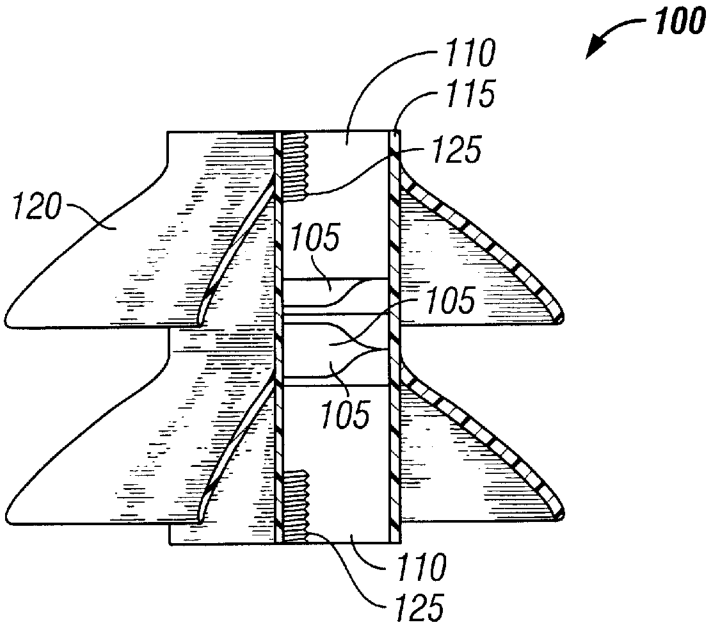
FIG. 1 is a partial cross-sectional view of a spark gap retrofit module for a surge arrester.
Figure 2:
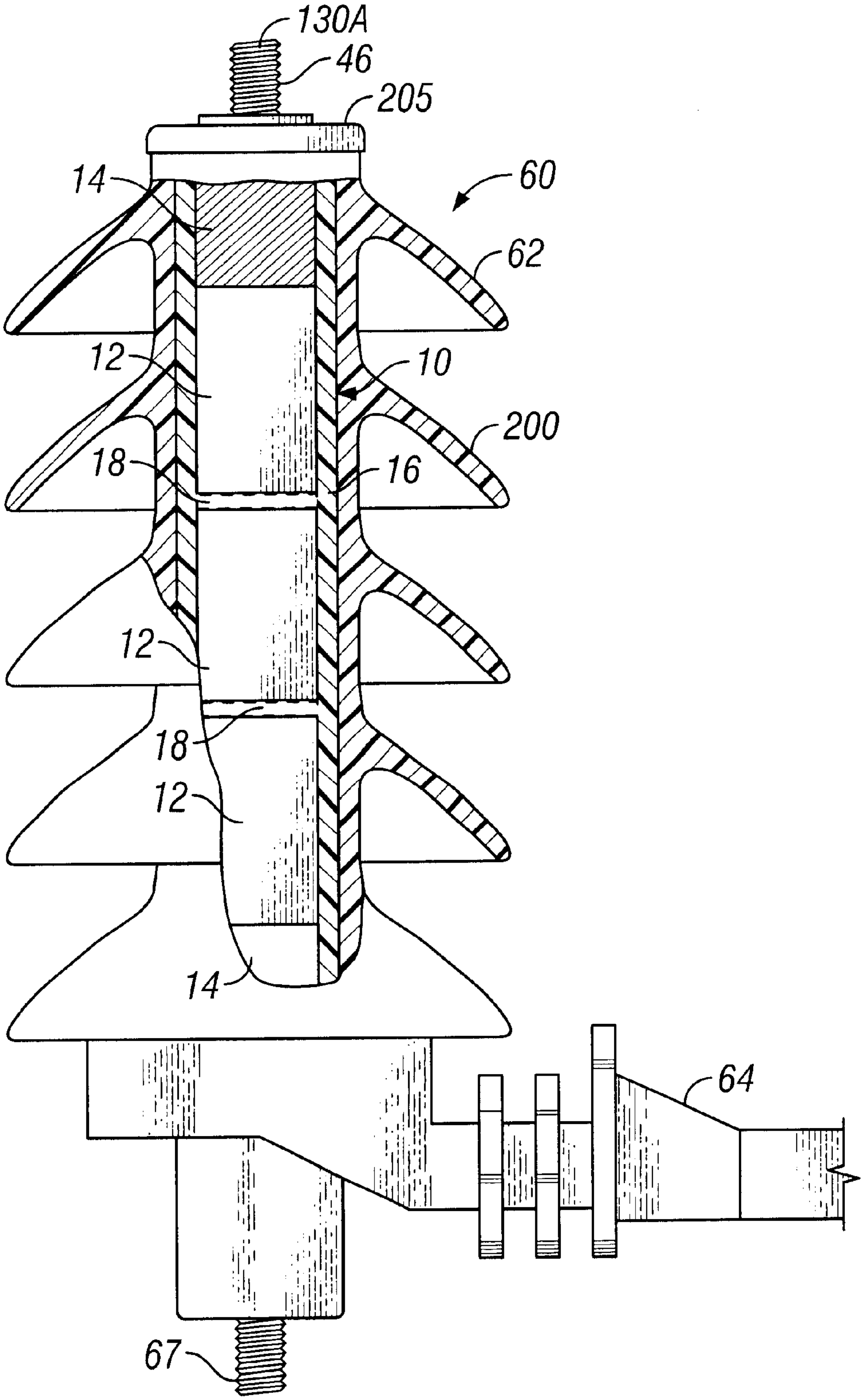
FIG. 2 is a partial cross-sectional view of a surge arrester.
Figure 3:
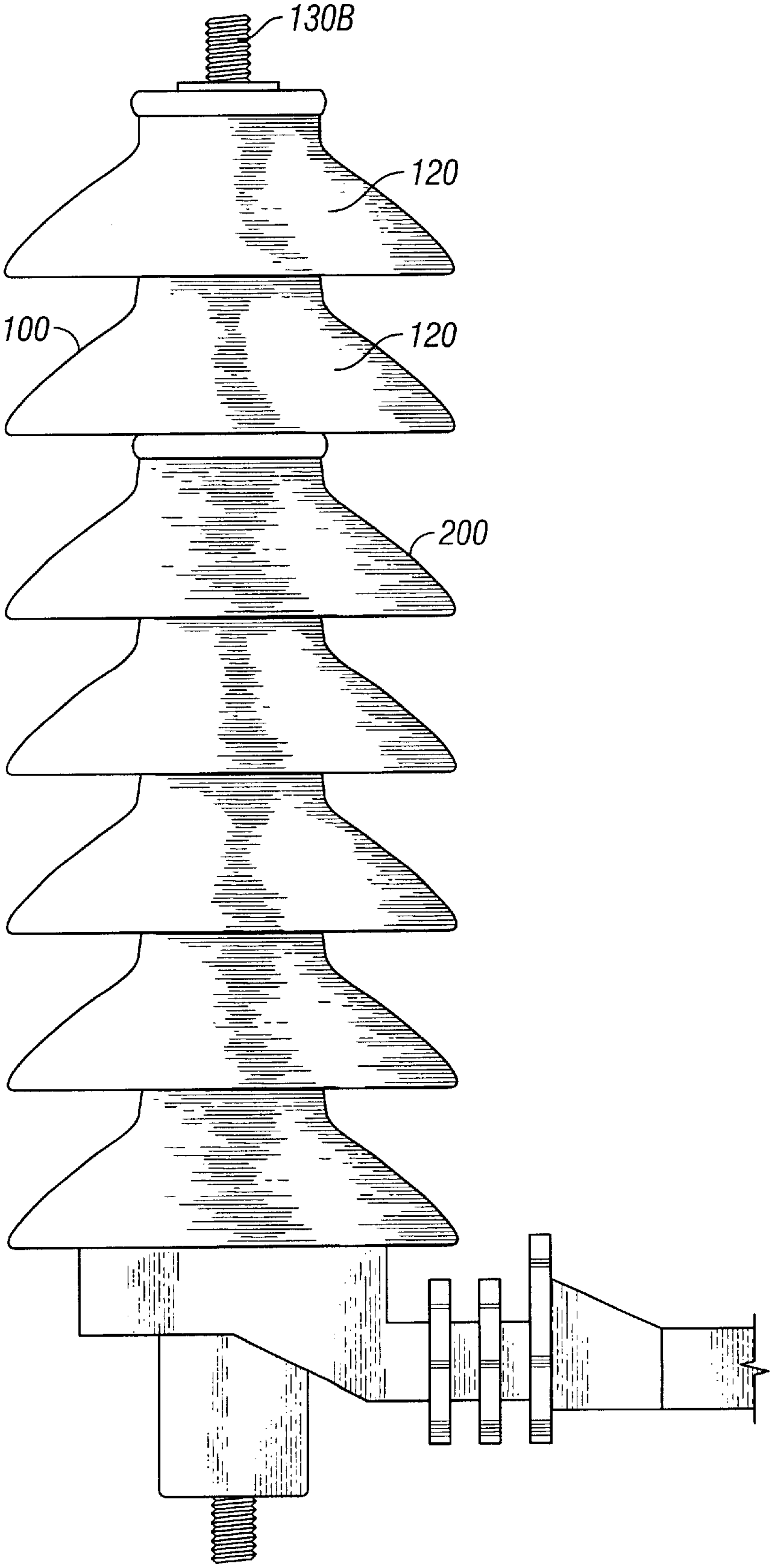
FIG. 3 is side view of the module of FIG. 1 mounted on the arrester of FIG. 2.

Referring to FIGS. 1–3, a spark gap retrofit module 100 for a surge arrester 200 may be used to increase the temporary power frequency overvoltage capability of the surge arrester 200. The module 100 is particularly useful for retrofitting gapless surge arresters, such as the arrester 200, to reduce their failure rate. For example, one implementation of the module is for use with gapless distribution arresters having 3–36 kV ratings and rated for normal duty (5 kA) or heavy duty (10 kA) operation. However, the module also may be applied to gapless surge arresters having higher ratings, to gapped surge arresters, and to other types of protective equipment. For example, the module may be employed in conjunction with a fuse.

The module 100 also may be used to protect surge arresters from ferroresonance related power frequency voltages. Ferroresonance is an overvoltage condition that may be caused by single phase switching of circuit inductance such as in the primary of a transformer when the secondary is lightly loaded or unloaded. These overvoltages may be as high as three times the normal operating voltage of the arresters connected to the primary. The module 100 would increase the power frequency overvoltage capability of the surge arresters connected to the primary isolating the arresters from attempting a discharge of the power system.

Referring particularly to FIG. 1, the module 100 includes three gap assemblies 105 positioned between a pair of terminals 110. The gap assemblies 105 and the terminals 110 are housed within an insulating housing 115 that may define a set of weathersheds 120. The housing 115 provides a moisture-impervious seal between the gap assemblies 105 and the external environment. Techniques for applying such a housing to a set of electrical components are described in U.S. application Ser. No. 09/142,079, filed Nov. 20, 1998, and titled "SELF-COMPRESSIVE SURGE ARRESTER MODULE AND METHOD OF MAKING SAME," which is incorporated by reference.

While three gap assemblies 105 are shown in FIG. 1, the number of gap assemblies in a module 100 may vary depending on the rating of the arrester 200 to which the module 100 is to be applied. For example, different implementations include from 1 to 12 gap assemblies, but are not restricted to this number of gap assemblies. Depending on the planned application, the gap assemblies may be resistively or capacitively graded, or both. The gap assemblies may include varistors, insulators, other impedance elements or open spark gaps.

The addition of the module 100 to the arrester 200 does not detrimentally affect the protective characteristics of the arrester 200. For example, the discharge voltage and the protective margin of the arrester 200 are unchanged or improved by adding the module 100. In one implementation, a retrofit module 100 is used to convert a gapless arrester rated at 10 kV to a gapped arrester rated at 12 kV.

Each terminal 110 includes a threaded hole 125 sized to receive a connecting bolt 130. Bolt sizes used in some implementations include, for example, those having 10 mm, 12 mm, or 0.375 inch diameters. The module 100 is connected to a bolt 130A (FIG. 2) extending from the line side 205 of the arrester 200. A second bolt 130B (FIG. 3) is inserted into the module 100 for use in connecting to the power line.

Other mechanisms may be used to connect the module 100 to the arrester 200 and the power line. For example, the module 100 may include bolts, with an intermediate bolt connecting the bolt of the module to a bolt of the arrester. Similarly, the module 100 may include a bolt extending from one terminal and a threaded hole in the other terminal. Other attachment techniques include eyebolts, clamps, press fit connections, and conductive adhesives.

Figure 4:
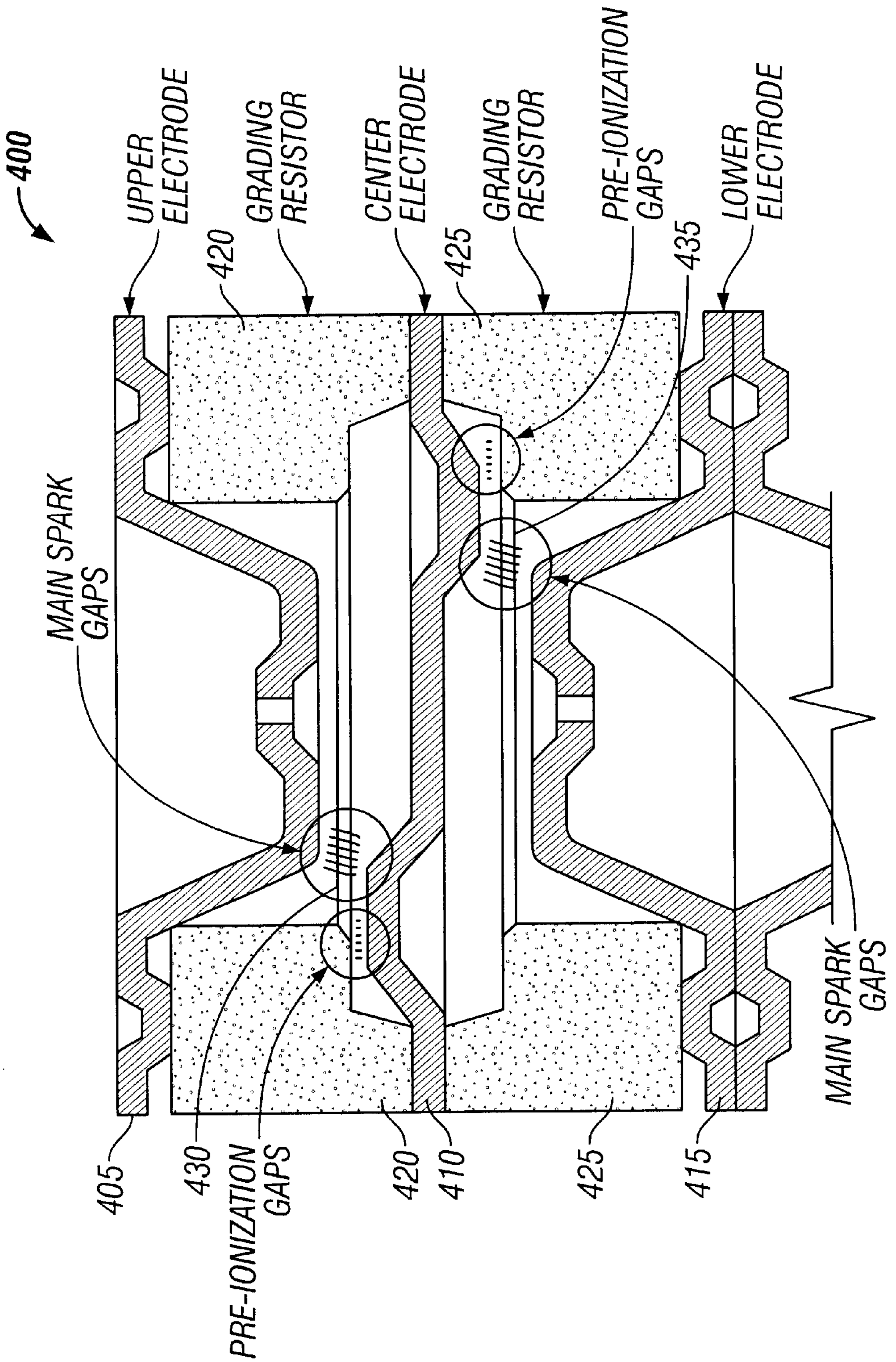
FIG. 4 is a cross-sectional side view of a spark gap assembly of the module of FIG. 1.

Referring also to FIG. 4, one implementation employs a resistance graded gap structure 400 as a gap assembly 105. The structure 400 employs an upper electrode 405, a center electrode 410, and a lower electrode 415. Silicon carbide grading ring resistors 420, 425 separate corresponding pairs of electrodes. The electrodes also are positioned so that a spark gap 430 is formed between the upper electrode 405 and the center electrode 410, and a spark gap 435 is formed between the center electrode 410 and the lower electrode 415.

A retrofitted arrester 200 including one or more gap structures 400 in the retrofit module 100 has three different modes of operation: the steady state mode, the temporary overvoltage (TOV) withstand mode, and the impulse mode. The particular mode in which the arrester operates depends upon the applied voltage and the frequency of that voltage. In explaining operation of the retrofitted arrester 200, the module 100 is treated as including three gap structures 400, and the arrester 200 is treated as including three 3 kV MOV disks to form a 9 kV retrofitted arrester. For purposes of explanation only, operation of this retrofitted arrester is discussed relative to a 9 kV gapless arrester including three 3 kV MOV disks. It is important to note that comparable results could be obtained using a hybrid arrester that includes MOVs and gap assemblies within the housing. However, such an approach requires the considerable expense of replacing an existing gapless arrester with a hybrid arrester, rather than just retrofitting the gapless arrester with a retrofit module.

Steady state is the most common mode (mode 1) of operation, and occurs when the arrester has normal line-to-ground voltage applied to it at a normal operating frequency (e.g., 50 or 60 Hz). In this mode, the voltage is distributed across the arrester 200 and the retrofit module 100, with the voltage distribution being a function of the individual component impedances.

Figure 5:
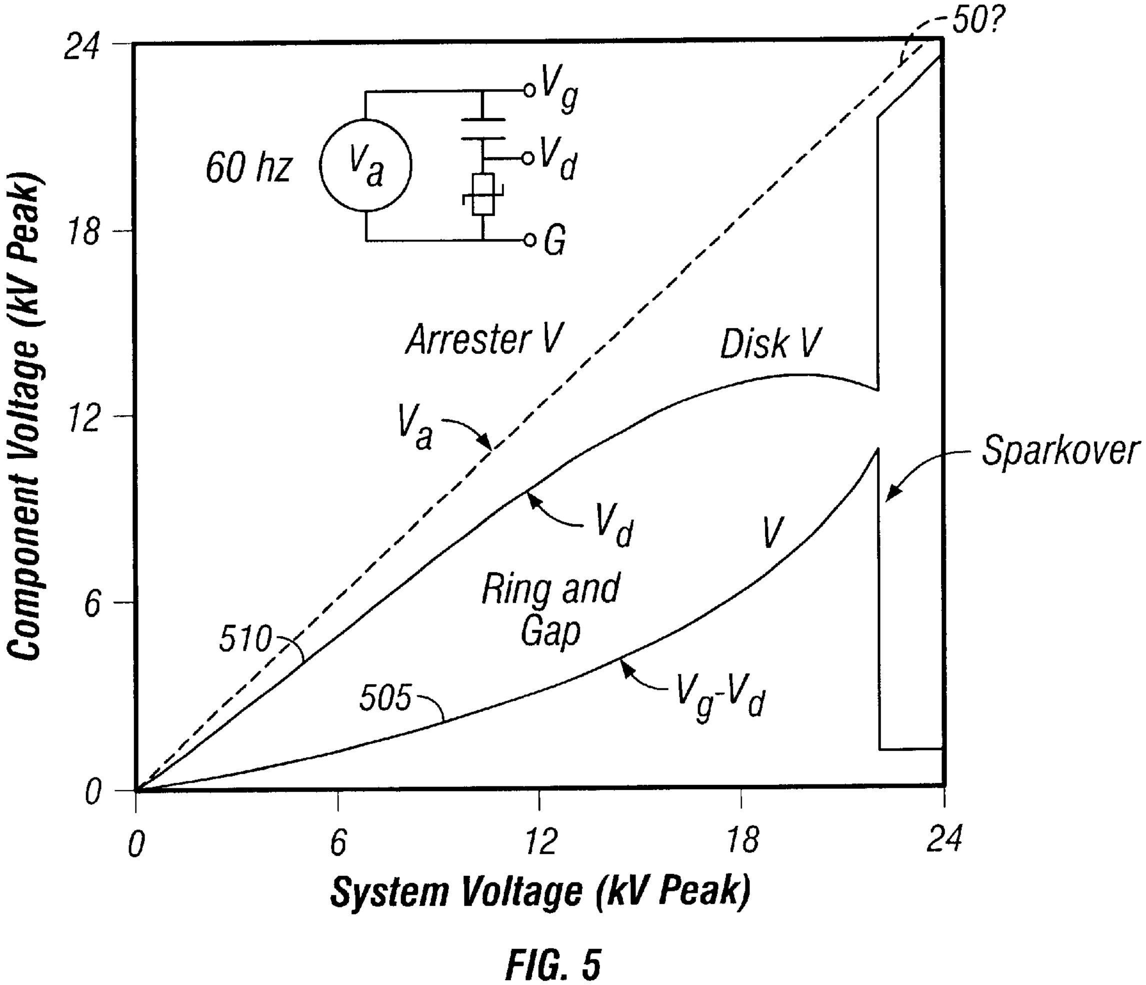
FIGS. 5–7 are graphs showing operating characteristics of gapless and retrofitted surge arresters.

The temporary overvoltage (TOV ) mode (mode 2) of operation occurs when an increased voltage occurs at the normal operating frequency. The retrofitted surge arrester is better able to endure such abnormal but commonly occurring conditions than is the surge arrester 200 standing alone. Referring to FIG. 5, as the applied voltage ($V_a$) 500 increases, the voltage 505 across the gap assemblies 400 may be optimally designed to ($V_g-V_d$) increase at a faster rate than does the voltage 510 across the MOV disks ($V_d$). This is due to the lower non-linearity of the impedance of the grading structure 420, 425 relative to the impedance of the MOV disks. This relative change in impedance results in a larger portion of the applied voltage being shifted from the MOV disks to the grading structure. This shift occurs without substantial current conduction, since the resistance-to-voltage curve of the grading structure is relatively flat due to the non-linear characteristic of the device.

Figure 6:
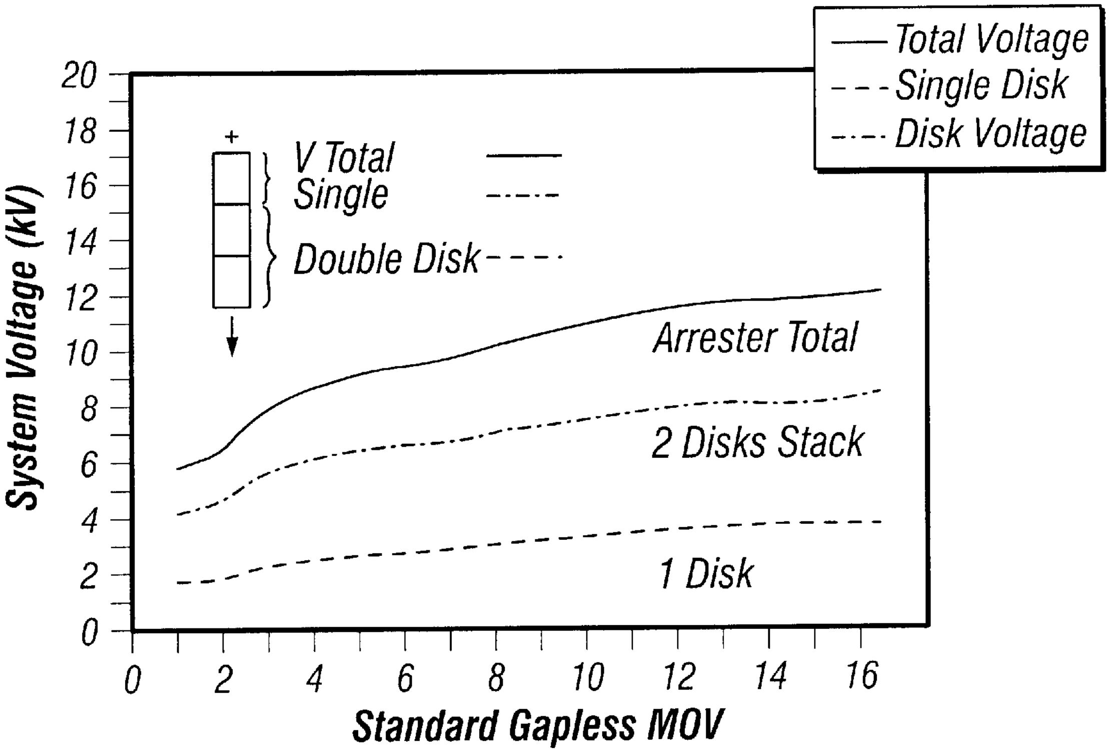
Figure 7:
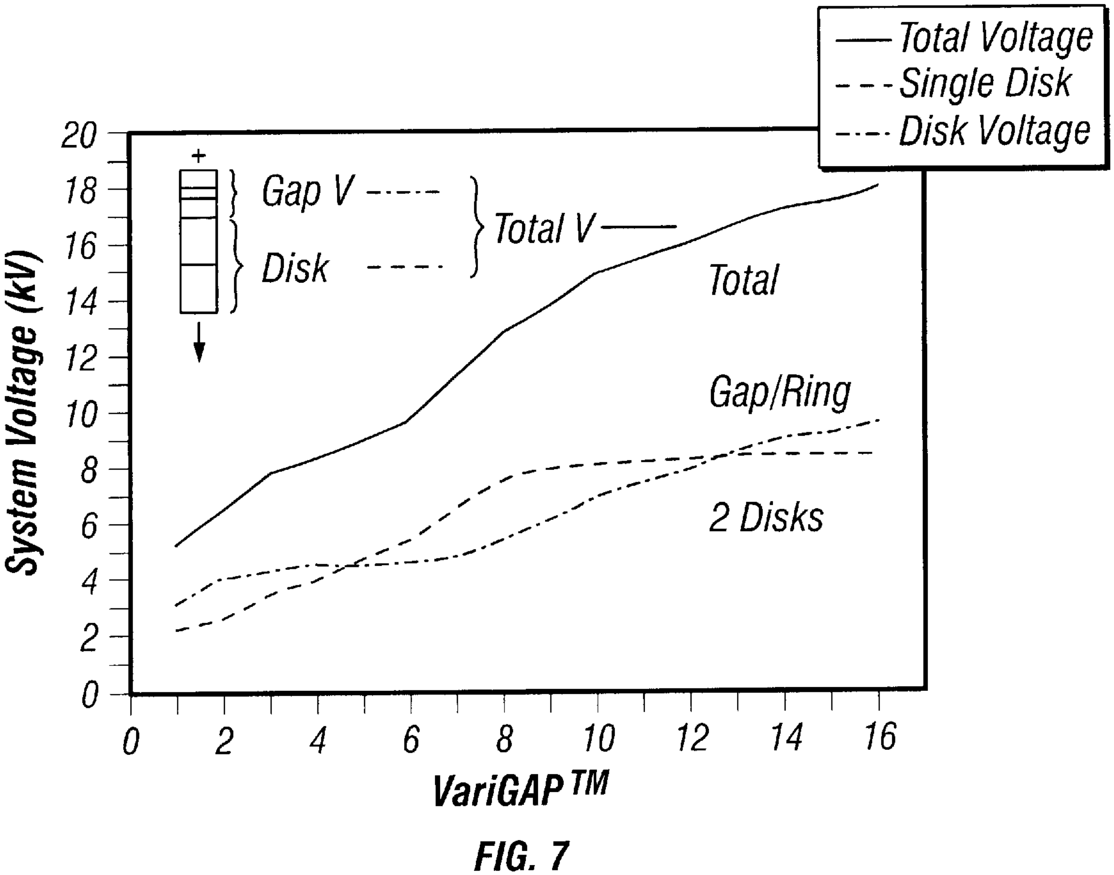

This partial isolation from system voltage delays the onset of conduction through the MOV disks, which results in the higher TOV capability of the retrofitted arrester. This continues until the sparkover voltage 515 is reached, at which point a spark is generated between the electrodes and the impedances 420, 425 are shunted. At this point, the resistance of the spark gap assemblies becomes essentially zero and the applied voltage 500 shifts to the MOV disks. FIGS. 6 and 7 illustrate the difference in temporary overvoltage capabilities between a gapless arrester design including MOV disks (FIG. 6) and a retrofitted arrester design (FIG. 7).

The impulse mode (mode 3) of operation occurs when a high single polarity voltage, such as associated with a lightning stroke, is applied to the arrester. The discharge voltage of such a retrofitted arrester is a function of the resistance of the MOV disks. Accordingly, the discharge voltage of a properly retrofitted arrester will be essentially the same as that of a gapless arrester.

However, the retrofitted arrester does achieve improved performance with respect to its ability in modes 1 and 2 to discharge current during the impulse mode of operation. During an impulse, once the sparkover voltage 515 is reached, the grading elements are shunted and begin to cool. At that time, the impulse voltage is applied to the MOV disks, which heat up and become less resistive. After the impulse is completely discharged, the cooled grading elements of the spark gap retrofit module assume a larger portion of the total arrester voltage. The corresponding reduction in the voltage to the MOV disks reduces the power dissipated by them, allowing them to cool faster. This enhances arrester durability and recovery during impulse events.

Other embodiments are within the scope of the following claims.

What is claimed is:

1. A method of retrofitting a surge arrester having electrical connections to a source of power and to electrical ground with a spark gap assembly to improve performance of the surge arrester, the method comprising:

providing a spark gap module including at least one spark gap assembly sealed within an insulating housing;

disconnecting an electrical connection of the surge arrester; and connecting the spark gap module between the electrical connection and the surge arrester.

2. The method of claim 1, wherein:

disconnecting the electrical connection comprises disconnecting the electrical connection to the source of power; and connecting the spark gap module comprises connecting the spark gap module between the electrical connection to the source of power and the surge arrester.

3. The method of claim 1, wherein:

disconnecting the electrical connection comprises disconnecting the electrical connection to electrical ground; and connecting the spark gap module comprises connecting the spark gap module between the electrical connection to electrical ground and the surge arrester.

4. The method of claim 1, wherein the surge arrester comprises a gapless surge arrester.

5. The method of claim 4, wherein the surge arrester comprises a gapless distribution arrester having a 3–36 kV rating.

6. The method of claim 5, wherein the gapless distribution arrester is rated for 5 kA operation.

7. The method of claim 5, wherein the gapless distribution arrester is rated for 10 kA operation.

8. The method of claim 1, wherein the spark gap module consists of one or more gap assemblies positioned between a pair of terminals, with the one or more gap assemblies and the terminals sealed within the housing.

9. The method of claim 8, wherein each terminal comprises a threaded bolt hole.

10. The method of claim 1, wherein the insulating housing comprises a polymer housing.

11. The method of claim 10, wherein the insulating housing defines one or more weathersheds.

12. The method of claim 1, wherein the insulating housing comprises a porcelain housing.

13. The method of claim 12, wherein the insulating housing defines one or more weathersheds.

14. The method of claim 1, wherein the at least one spark gap assembly comprises an impedance graded gap structure.

15. The method of claim 14, wherein the gap structure comprises electrically conducting electrodes separated by impedance grading elements.

16. The method of claim 1, further comprising selecting the spark gap module such that connection of the spark gap module does not detrimentally affect protective characteristics of the surge arrester.

17. The method of claim 1, wherein providing the spark gap module in conjunction with the surge arrester increases the power frequency overvoltage capability of the surge arrester.

18. The method of claim 1, wherein providing the spark gap module in conjunction with the surge arrester protects the surge arrester from ferroresonance related power frequency voltages.

19. A method of retrofitting a surge arrester with a spark gap assembly to improve performance of the surge arrester, the method comprising:

providing a spark gap module including at least one spark gap assembly sealed within an insulating housing;

providing a surge arrester including an active electrical component sealed within a second, separate insulating housing; and connecting the spark gap module to the surge arrester.

20. The method of claim 19, wherein:

the surge arrester includes a power end and a ground end; and connecting the spark gap module to the surge arrester comprises connecting the spark gap module to the power end of the surge arrester.

21. The method of claim 20, wherein:

the surge arrester includes a power end and a ground end; and connecting the spark gap module to the surge arrester comprises connecting the spark gap module to the ground end of the surge arrester.

22. The method of claim 19, wherein the surge arrester comprises a gapless surge arrester.

23. The method of claim 19, wherein the spark gap module consists of one or more gap assemblies positioned between a pair of terminals, with the one or more gap assemblies and the terminals sealed within the first insulating housing.

24. The method of claim 23, wherein each terminal comprises a threaded bolt hole.

25. The method of claim 19, wherein the first insulating housing comprises a polymer housing.

26. The method of claim 25, wherein the first insulating housing defines one or more weathersheds.

27. The method of claim 19, wherein the first insulating housing comprises a porcelain housing.

28. The method of claim 27, wherein the first insulating housing defines one or more weathersheds.

29. The method of claim 19, wherein the at least one spark gap assembly comprises an impedance graded gap structure.

30. The method of claim 29, wherein the gap structure comprises electrodes separated by impedance elements.

31. The method of claim 19, further comprising selecting the spark gap module such that connection of the spark gap module does not detrimentally affect protective characteristics of the surge arrester.

32. The method of claim 19, wherein providing the spark gap module includes providing a grading structure having a lower non-linearity relative to the active electrical component of the surge arrester resulting in a larger portion of a temporary over-voltage being shifted from the surge arrester to the spark gap module.

33. The method of claim 32, wherein a larger portion of the temporary overvoltage is shifted back to the surge arrester when a spark-over threshold voltage of the spark gap assembly is exceeded causing the spark gap assembly to shunt the grading structure.

34. A retrofit module for adding a spark gap assembly to a surge arrester to improve performance of the surge arrester, the module comprising:

an insulating housing;

a first electrode within the insulating housing;

a second electrode within the insulating housing;

a grading structure positioned inside the insulating housing between the first electrode and the second electrode to form a space defining a spark gap between the first electrode and the second electrode; and structure for electrically connecting the spark gap assembly to a surge arrester, the structure being accessible from outside the insulating housing.

35. The retrofit module of claim 34, wherein the grading structure comprises a grading resistor.

36. The retrofit module of claim 35, wherein the grading resistor comprises a silicon carbide grading resistor.

37. The retrofit module of claim 34, wherein the grading structure comprises a capacitive grading structure.

38. The retrofit module of claim 37, wherein the capacitive grading structure comprises ceramic capacitors.

39. The retrofit module of claim 34, wherein the grading structure is ring-shaped.

* * * * *